US006911161B2

(12) United States Patent
Xu et al.

(10) Patent No.: US 6,911,161 B2
(45) Date of Patent: Jun. 28, 2005

(54) STABILIZED NICKEL-CONTAINING CATALYSTS AND PROCESS FOR PRODUCTION OF SYNGAS

(75) Inventors: Bang C. Xu, Ponca City, OK (US); Sriram Ramani, Ponca City, OK (US); Sergej A. Maslov, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 314 days.

(21) Appl. No.: 10/187,652

(22) Filed: Jul. 2, 2002

(65) Prior Publication Data

US 2004/0005270 A1 Jan. 8, 2004

(51) Int. Cl.⁷ ................................. C01B 3/36
(52) U.S. Cl. .................. 252/373; 502/302; 502/330
(58) Field of Search ..................... 252/373; 502/330

(56) References Cited

U.S. PATENT DOCUMENTS

| | | | |
|---|---|---|---|
| 3,666,412 A | 5/1972 | Sowards | 23/162 |
| 3,791,993 A | 2/1974 | Rostrup-Nielsen | 252/466 |
| 3,926,583 A | 12/1975 | Rostrup-Nielsen | 48/214 |
| 3,957,682 A | 5/1976 | Dorawala et al. | 252/373 |
| 4,060,498 A | 11/1977 | Kawagoshi et al. | 252/373 |
| 4,083,799 A | 4/1978 | Estes et al. | 252/373 |
| 4,380,673 A * | 4/1983 | Bournonville et al. | 568/361 |
| 4,767,569 A * | 8/1988 | Brophy et al. | 502/330 |
| 5,112,527 A | 5/1992 | Kobylinski | 252/373 |
| 5,149,464 A | 9/1992 | Green et al. | 252/373 |
| 5,500,149 A | 3/1996 | Green et al. | 252/373 |
| 5,648,582 A | 7/1997 | Schmidt et al. | 585/652 |
| 5,720,901 A * | 2/1998 | De Jong et al. | 502/330 |
| 5,997,835 A | 12/1999 | Hyldtoft et al. | 423/418.2 |
| 6,235,673 B1 * | 5/2001 | Zoeller et al. | 502/330 |
| 6,447,745 B1 * | 9/2002 | Feeley et al. | 252/373 |
| 6,461,539 B1 * | 10/2002 | Gaffney | 252/373 |
| 6,706,662 B2 * | 3/2004 | Morgenstern et al. | 502/330 |
| 2002/0000539 A1 * | 1/2002 | Gaffney et al. | |

FOREIGN PATENT DOCUMENTS

| | | | |
|---|---|---|---|
| EP | 0303438 A3 | 2/1989 | C01B/3/38 |
| EP | 0640561 A1 | 8/1994 | C01B/3/40 |
| JP | S59-184701 | 10/1984 | C01B/3/22 |
| SU | 1189500 | 1/1984 | C01B/3/40 |
| WO | WO97/31738 | 9/1997 | B22F/3/11 |
| WO | WO99/35082 | 7/1999 | C01B/3/38 |

OTHER PUBLICATIONS

V.R. Choudhary et al., *Low–temperature selective oxidation of methane to carbon monoxide and hydrogen over cobalt–MgO catalysts*, Applied Catalysis A: General, 90 (1992) L1–L5, (no month).
Y.H. Hu et al., *Binary MgO–Based Solid Solution Catalysts for Methane Conversion to Syngas*, Catalysis Reviews, 44(3) (2002) 423–453, (no month).

PCT Search Report for PCT/US01/00053, (no date).
P.D.F. Vernon et al., "Partial oxidation of methane to synthesis gas," Catalysis Letters (1990) 6:181–186, (no month).
V.R. Choudhary et al., "Selective Oxidation of Methane to CO and $H_2$ over Ni/MgO at Low Temperatures," COMMUNICATIONS, Angew. Chem. Int. Ed. Engl. (1992) 9:1189–1190, (no month).
D.A. Hickman et al., "Synthesis Gas Formation by Direct Oxidation of Methane over Pt Monoliths," J. of Catalysts (1992) 138:267–282, (no month).
J. Nakamura et al., "Production of Synthesis Gas by Partial Oxidation of Methane over the Group VIII Metal Catalysts," Sekiyu Gakkaishi (1993) 36 (2) 97–104, (no month).
T. Hayakawa et al., "Partial Oxidation of Methane to Synthesis Gas over (La,Sr) (Co,Ni) Oxide Catalysts," Sekiyu Gakkaishi (1996) 39 (5) 314–321, (no month).
M. Stojanović et al., "Reaction Kinetics of Methane Oxidation over $LaCr_{1-x}Ni_xO_3$ Perovskite Catalysts," J. of Catalysis (1997) 166:324–332, (no month).
V.R. Choudhary et al., "Oxidative Conversion of Methane to Syngas over Nickel Supported on Commercial Low Surface Area Porous Catalysts Carriers Precoated with Alkaline and Rare Earth Oxides," J. of Catalysis (1997) 172:281–293, (no month).
M.F.M. Zwinkels et al., "Catalytic Fuel Combustion in Honeycomb Monolith Reactors," Structured Catalyst and Reactors edited by A. Cybulski et al., Marcel Dekker, Inc. (1998) 6:149–177, (no month).
X. Xu and J.A. Moulijn, "Transformation of a Structured Carrier into Structured Catalysts," Structured Catalysts and Reactors, edited by A. Cybulski, Marcel Dekker, Inc. (1998) 21:599–615, (no month).
C.J. Geankoplis, "Transport Processes and Unit Operations," Allyn and Bacon, Inc., p. 837, (no date).
M. Liao et al., "Dissociation of methane on different transition metals," J. of Molecular Catalysts A: Chemical (1998) 136:185–194, (no month).
K. Otsuka et al., "Production of Hydrogen through Decomposition of Methane with Ni–supported Catalysts," Chemistry Letters (1999) 1179–1180, (no month).
M.B. Davis et al., "Methane Oxidation Over Noble Metal Gauzes: An LIF Study," Combustion and Flame (2000) 123:159–174, (no month).
C. Li et al., "Comparison of Partial Oxidation of $CH_4$ to Syngas Over a $Ni/Al_2O_3$ Catalyst Under Different Pressures," J. of Fuel Chemistry and Technology (2001) 29:111–115, (no month).

* cited by examiner

Primary Examiner—Wayne A. Langel
(74) Attorney, Agent, or Firm—Conley Rose P.C.

(57) ABSTRACT

A method is disclosed for converting light alkanes (e.g. methane or natural gas) to synthesis gas employing a stabilized Ni-based catalyst that is active for catalyzing the net partial oxidation of the hydrocarbon, in the presence of $O_2$ to CO and $H_2$. Certain preferred catalysts comprise Ni alloyed with a Ni-stabilizing amount of gold or silver, and a lanthanide element, carried on a refractory support.

41 Claims, No Drawings

STABILIZED NICKEL-CONTAINING CATALYSTS AND PROCESS FOR PRODUCTION OF SYNGAS

BACKGROUND OF THE INVENTION

1. Field of the Invention

The present invention generally relates to Ni-based catalysts and processes that employ such catalysts for catalytically converting light hydrocarbons (e.g., natural gas) to synthesis gas. More particularly, the invention relates to stabilized Ni-containing catalysts that are active for catalyzing the selective partial oxidation of methane and other light hydrocarbons to CO and $H_2$.

2. Description of Related Art

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on methane as a starting material for the production of higher hydrocarbons and hydrocarbon liquids. The conversion of methane to hydrocarbons is typically carried out in two steps. In the first step, methane is reformed with water to produce carbon monoxide and hydrogen (i.e., synthesis gas or syngas). In a second step, the syngas is converted to hydrocarbons, for example, using the Fischer-Tropsch process to provide fuels that boil in the middle distillate range, such as kerosene and diesel fuel, and hydrocarbon waxes. Present day industrial use of methane as a chemical feedstock typically proceeds by the initial conversion of methane to carbon monoxide and hydrogen by either steam reforming, which is the most widely used process, or by dry reforming. Steam reforming proceeds according to Equation 1.

$$CH_4 + H_2O \rightleftharpoons CO + 3H_2 \qquad (1)$$

Although steam reforming has been practiced for over five decades, efforts to improve the energy efficiency and reduce the capital investment required for this technology continue.

The partial oxidation of hydrocarbons, e.g., natural gas or methane is another process that has been employed to produce syngas. While currently limited as an industrial process, partial oxidation has recently attracted much attention due to significant inherent advantages, such as the fact that significant heat is released during the process, in contrast to the steam reforming processes, which are endothermic. Partial oxidation of methane proceeds exothermically according to the following reaction stoichiometry:

$$CH_4 + 1/2 O_2 \rightarrow CO + 2H_2 \qquad (2)$$

In the catalytic partial oxidation processes, natural gas is mixed with air, oxygen or oxygen-enriched air, and is introduced to a catalyst at elevated temperature and pressure. The partial oxidation of methane yields a syngas mixture with a $H_2$:CO ratio of 2:1, as shown in Equation 2. This ratio is more useful than the $H_2$:CO ratio from steam reforming for the downstream conversion of the syngas to chemicals such as methanol and to fuels. Furthermore, oxidation reactions are typically much faster than reforming reactions. This makes possible the use of much smaller reactors for catalytic partial oxidation processes. The syngas in turn may be converted to hydrocarbon products, for example, fuels boiling in the middle distillate range, such as kerosene and diesel fuel, and hydrocarbon waxes by processes such as the Fischer-Tropsch synthesis.

The selectivities of catalytic partial oxidation to the desired products, carbon monoxide and hydrogen, are controlled by several factors, but one of the most important of these factors is the choice of catalyst composition. Difficulties have arisen in the prior art in making such a choice economical. Typically, catalyst compositions have included precious metals and/or rare earths. The large volumes of expensive catalysts needed by the existing catalytic partial oxidation processes have placed these processes generally outside the limits of economic justification.

A number of process regimes have been described in the literature for the production of syngas via catalyzed partial oxidation reactions. The noble metals, which typically serve as the best catalysts for the partial oxidation of methane, are scarce and expensive. The more widely used, less expensive, catalysts have the disadvantage of promoting coke formation on the catalyst during the reaction, which results in loss of catalytic activity. Moreover, in order to obtain acceptable levels of conversion of gaseous hydrocarbon feedstock to CO and $H_2$ it is typically necessary to operate the reactor at a relatively low flow rate, or space velocity, using a large quantity of catalyst.

For successful operation at commercial scale, however, the catalytic partial oxidation process must be able to achieve a high conversion of the methane feedstock at high gas hourly space velocities, and the selectivity of the process to the desired products of carbon monoxide and hydrogen must be high. Such high conversion and selectivity must be achieved without detrimental effects to the catalyst, such as the formation of carbon deposits ("coke") on the catalyst, which severely reduces catalyst performance. Accordingly, substantial effort has been devoted in the art to the development of economical catalysts allowing commercial performance without coke formation. Not only is the choice of the catalyst's chemical composition important, the physical structure of the catalyst and catalyst support structures must possess mechanical strength and porosity, in order to function under operating conditions of high pressure and high flow rate of the reactant and product gasses. Another continuing objective in this field is to develop stronger catalysts and catalyst supports that do not cause a high pressure drop when subjected to high pressure reactant gases.

Of the methods that employ nickel-containing catalysts for oxidative conversion of methane to syngas, typically the nickel is supported by alumina or some other type of ceramic support. For example, V. R. Choudhary et al. (*J. Catal.*, Vol. 172, pages 281–293, 1997) disclose the partial oxidation of methane to syngas at contact times of 4.8 ms (at STP) over supported nickel catalysts at 700 and 800° C. The catalysts were prepared by depositing NiO—MgO on different commercial low surface area porous catalyst carriers consisting of refractory compounds such as $SiO_2$, $Al_2O_3$, SiC, $ZrO_2$ and $HfO_2$. Catalysts were also prepared by depositing NiO on the catalyst carriers with different alkaline and rare earth oxides such as MgO, CaO, SrO, BaO, $Sm_2O_3$ and $Yb_2O_3$.

U.S. Pat. No. 5,500,149 (assigned to British Gas plc) describes a $Ni/Al_2O_3$ catalyst that catalyzes the reaction $CO_2 + CH_4 \rightarrow 2CO + 2H_2$, and demonstrates how reaction conditions can affect the product yield. The partial oxidation of methane to synthesis gas using various transition metal catalysts under a range of conditions has been described by Vernon, D. F. et al. (*Catalysis Letters* 6:181–186 (1990)). European Pat. App. Pub. No. 640561 discloses a catalyst for the catalytic partial oxidation of hydrocarbons comprising a Group VIII metal on a refractory oxide having at least two cations. Multimonolith combustors are discussed by M. F. M. Zwinkels, et al. in a chapter entitled "Catalytic Fuel Combustion in Honeycomb Monolith Reactors" (Ch. 6, A. Cybulski et al., eds., STRUCTURED CATALYSTS AND REACTORS. 1998. Marcel Dekker, Inc., pp.149–177.)

European Patent No. EP 303,438 (assigned to Davy McKee Corporation) describes a catalytic partial oxidation process for converting a hydrocarbon feedstock to synthesis gas using steam in addition to oxygen. Certain high surface area monoliths coated with metals or metal oxides, e.g., Pd, Pt, Rh, Ir, Os, Ru, Ni, Cr, Co, Ce, La, which are active as oxidation catalysts, are employed in that process. Other suggested coating metals are noble metals and metals of groups IA, IIA, III, IV, VB, VIB, or VIIB of the periodic table of the elements.

M. B. Davis et al. discloses that in the presence of excess oxygen, bulk Ni is relatively inert as a catalyst for oxidation of methane in air at temperatures of about 1,000° C., while Pt and Pt—Rh are catalytically active (*Combustion and Flame* (2000) 123: 159–174). Those investigators showed that 40-mesh Ni gauze did not ignite and there was no conversion of methane under methane partial oxidation conditions, however once temperatures greater than 1,375° K were reached, a homogeneous ignition was apparent.

U.S. Pat. Nos. 3,957,682 and 4,083,799 (assigned to Texaco, Inc.) disclose an Iconel metal screen consisting of about 50–95% nickel that is a methane steam reforming catalyst. In these processes the Ni catalyst is initially activated by heating in an oxygen-containing gas. Similarly, U.S. Pat. No. 5,112,527 (assigned to Amoco Corporation) also describes Ni as a reforming catalyst in the presence of steam, a gaseous lower alkane and air and in combination with a Group VIII metal having partial oxidation activity.

Japanese Pat. App. No. S59-184701 (assigned to Hiroshima Laboratory) describes certain Ni—Cr and Ni—Mb alloy powder catalysts that are active as methanol reformers.

Liao, M.-S., et al. ("Dissociation of methane on different transition metals," *J. Mol. Catal. A: Chem.* (1998) 136:185–194) give a theoretical comparison between Ru, Ir, Rh, Ni, Pd, Pt, Cu, Ag and Au. Those authors concluded that transition metals are very active, and coinage metals are inactive for generating CO and $H_2$ from methane. Methane dissociation in the presence of adsorbed oxygen was also modeled.

J. Nakamura et al. (*Sekiyo Gakkaishi* (1993) 36:97–104) discuss the production of syngas by partial oxidation of $CH_4$ over Group VIII metal catalysts. A variety of $SiO_2$-supported metals were studied. Rh, Ru and Ni produced $CO_2$ and $H_2O$ below 700° K, whereas CO and $H_2$ were produced above 700° K via $CO_2/H_2O$ reforming of excess $CH_4$. Pt at 900° K also produced syngas, but reverse water-gas shift was active on this metal. Fe and Co only produced $CO_2$ and $H_2O$.

T. Hayakawa et al. (*Sekiyo Gakkaishi* (1996) 39:314–321) describe certain (La,Sr)(Co,Ni) oxide catalysts, having a perovskite structure, that are said to be active for the oxidative conversion of methane to synthesis gas. The stable activity of $La_{0.8}Sr_{0.2}Co_{0.8}Ni_{0.2}O_{3-\delta}$ catalyst is said to be likely due to high dispersion of Ni metal and the presence of $La_2O_3$ and SrO as the carriers of the Ni catalyst.

U.S. Pat. No. 5,149,464 is directed to a method for selectively oxygenating methane to carbon monoxide and hydrogen by bringing the reactant gas mixture at a temperature of about 650° C. to 900° C. into contact with a solid catalyst which is generally described as being either:

a) a catalyst of the formula $M_xM'_yO_z$, where:

M is at least one element selected from Mg, B, Al, Ln, Ga, Si, Ti, Zr and Hf; Ln is at least one member of lanthanum and the lanthanide series of elements;

M' is a d-block transition metal, and each of the ratios x/y and y/z and (x+y)/z is independently from 0.1 to 8; or b) an oxide of a d-block transition metal; or c) a d-block transition metal on a refractory support; or d) a catalyst formed by heating a) or b) under the conditions of the reaction or under non-oxidizing conditions. The d-block transition metals are said to include those having atomic number 21 to 29, 40 to 47 and 72 to 79 (i.e., the metals Sc, Ti, V, Cr, Mn, Fe, Co, Ni, Cu, Zr, Nb, Mo, Tc, Ru, Rh, Pd, Ag, Hf, Ta, W, Re, Os, Ir, Pt and Au).

U.S. Pat. No. 5,997,835 (assigned to Haldor Topsoe A/S) discloses that addition of small amounts of gold to a nickel-containing catalyst provides a catalyst with suppressed carbon deposition during steam reforming of hydrocarbons. Although gold decreases the catalytic activity of the nickel catalyst, the catalyst still provides sufficient activity for steam reforming. The gold and nickel are said to form a type of surface alloy.

Soviet Union Patent No. 1189500 (N. N. Kundo et al.) describes certain Ni or Ni—Cr alloy catalysts for air-$O_2$ conversion of $CH_4$ at atmospheric pressure. The catalyst is prepared by treating a polyurethane foam matrix with a suspension of Ni powder in aqueous carboxymethylcellulose, and then calcining in a reducing atmosphere.

WO 99/35082 (assigned to Regents of the University of Minnesota) describes certain unsupported transition metal monolith catalysts for catalyzing the partial oxidation of methane to synthesis gas. Transition metals said to be useful are Fe, Os, Co, Rh, Ir, Ni, Cu, Pd, Pt and mixtures thereof. Nickel supported on alumina monoliths was not found to be useful for syngas production.

U.S. Pat. No. 5,648,582 (assigned to Regents of the University of Minnesota) describes certain ceramic monolith supported rhodium, nickel and platinum catalysts for the catalytic partial oxidation of methane in gas phase at very short residence time (800,000 to 12,000,000 $h^{-1}$). Increasing the catalyst temperature improved selectivities for CO and $H_2$ products and improved methane conversion.

Li, Yu and Shen (*J Fuel Chem and Tech* (2001) 29:112–115) describe the effects of increasing pressure on partial oxidation of methane to syngas using nickel on an alumina support as the catalyst. It was concluded that at high pressure, the partial oxidation of methane is thermodynamically unfavorable. Not only does it affect the selectivities to $H_2$ and CO, high pressure also restrains the decomposition of $CH_4$ over the NiO form of catalyst. Decomposition of $CH_4$ over the $Ni^0$ form of the catalyst occurs quickly, however.

In order to operate at very high flow rates, at high pressure and using smaller catalyst beds in the smaller, short contact time (i.e., millisecond range) catalytic partial oxidation (CPOX) reactors, the catalysts should be highly active, have excellent mechanical strength, resistance to rapid temperature fluctuations and thermal stability at partial oxidation reaction temperatures. Conventional Ni-based catalysts suffer from Ni metal loss and carbon formation, which prevents their use under high pressure and high flow rate conditions, which are required for short contact time CPOX processes. Presently, most Ni-based syngas catalysts are promoted with precious metals such as Rh or Pt, to deter coking. In addition to being very expensive, those catalysts usually operate at high reaction temperatures of more than 1,000° C. and tend to promote steam reforming. Accordingly, there is a continuing need for more commercially attractive catalyst compositions for the catalytic partial oxidation of hydrocarbons, particularly methane, or methane containing feeds, in which the catalyst retains a high level of activity and selectivity to carbon monoxide and hydrogen under conditions of high gas space velocity, elevated pressure and temperature during extended use on stream.

SUMMARY OF PREFERRED EMBODIMENTS

The stabilized nickel catalysts and the methods of the present invention overcome some of the drawbacks of existing syngas catalysts and processes for converting light hydrocarbons to syngas. The new catalysts, which include a nickel-stabilizing metal are more stable and give higher syngas yield than conventional Ni-based catalysts under conditions of high gas space velocity and elevated pressure. In the preferred syngas production methods, the reaction stoichiometry favors the catalytic partial oxidation reaction as the primary reaction catalyzed by the nickel-stabilized catalyst. The term "Ni-stabilizing metal" means a metal, preferably gold or silver, that is capable of alloying or otherwise combining or associating with metallic nickel such that the melting point of nickel is increased above at least the minimum operating temperature of a CPOX syngas production process and/or volatilization of the nickel is deterred under syngas reactor operating conditions. As a result of their enhanced stability and longer on stream life, these "stabilized" nickel-based catalysts, even containing 1 wt. % or more of silver or gold (based on total catalyst weight), are more economically feasible for use under commercial-scale conditions than rhodium or platinum promoted nickel catalysts.

Another advantage of the new catalysts employed for syngas production is that they demonstrate a high level of activity and selectivity to carbon monoxide and hydrogen under conditions of high gas hourly space velocity, elevated pressure and high temperature. The improved stability also manifests itself in terms of more constant reactor exit temperatures and product gas compositions.

In accordance with certain embodiments of the present invention a method or process of converting a $C_1$–$C_5$ hydrocarbon, such as methane or natural gas, and $O_2$ to a product gas mixture containing CO and $H_2$, is provided. The process comprises mixing the hydrocarbon-containing feed and an $O_2$ containing feed to provide a reactant gas feed mixture. The $O_2$ containing feedstock may be pure oxygen gas, air or $O_2$-enriched air. The reactant gas mixture may also include incidental or non-reactive species, in lesser amounts than the primary hydrocarbon and oxygen components. Some such species are $H_2$, CO, $N_2$, $NO_x$, $CO_2$, $N_2O$, Ar, $SO_2$ and $H_2S$, as can exist normally in natural gas deposits. Additionally, in some instances, it may be desirable to include nitrogen gas in the reactant gas mixture to act as a diluent. Nitrogen can be present by addition to the reactant gas mixture or can be present because it was not separated from the air that supplies the oxygen gas. The reactant gas mixture is fed into a suitable reactor (a "short contact time reactor") where it comes into contact with a catalytically effective amount of a stabilized Ni-based catalyst in the reaction zone of the reactor such that each portion of reactant gas mixture flowing over the catalyst is in contact with the catalyst for no more than about 200 milliseconds, preferably under 50 milliseconds, more preferably under 20 milliseconds, with 10 milliseconds being highly preferred.

The method also includes maintaining catalytic partial oxidation (CPOX) promoting conditions during the contacting such that syngas is produced containing a molar ratio of $H_2$:CO of about 2:1. As used herein, the term "about" or "approximately," when preceding a numerical value, has its usual meaning and also includes the range of normal measurement variations that is customary with laboratory instruments that are commonly used in this field of endeavor (e.g., weight, temperature or pressure measuring devices), preferably within ±10% of the stated numerical value.

Advantageously, certain preferred embodiments of the process are operated at superatmospheric reactant gas pressure (preferably in excess of 2 atmospheres or about 200 kPa) to efficiently produce synthesis gas. The nickel-based catalyst comprises nickel and a Ni-stabilizing metal, such as Au, preferably disposed on a refractory support. The term "Ni-stabilizing metal" means a metal, preferably gold or silver, that is capable of alloying or otherwise combining or associating with metallic nickel such that the melting point of nickel is increased above at least the minimum operating temperature of a CPOX syngas production process and/or volatilization of the nickel is deterred under syngas reactor operating conditions. In certain embodiments, the Ni-stabilizing metal comprises up to about 3.3% by weight of the total metal content of the supported catalyst employed in the method. In certain embodiments, the refractory support comprises a material chosen from the group consisting of zirconia, alumina, cordierite, mullite, magnesia, titania, silica, beryllia, thoria, lanthania, calcium oxide, and combinations thereof.

Also provided in accordance with certain embodiments of the present invention is a supported nickel-based syngas catalyst comprising Ni, a Ni-stabilizing metal capable of alloying with the Ni, preferably Au or Ag, and a refractory support. In preferred embodiments the catalyst also contains a lanthanide element, more preferably ytterbium or samarium. In some embodiments, the supported nickel-based syngas catalyst comprises one or more structures such as monoliths, gauzes, disks, granules, beads, pills, pellets, cylinders, trilobes, extrudates, and spheres. In preferred embodiments the supported nickel-based syngas catalyst comprises an alloy of Ni and a nickel-stabilizing amount of Au or Ag, in their reduced metal states, carried on a refractory support such as a partially stabilized (MgO) zirconia foam monolith. In some embodiments the supported nickel-based syngas catalyst includes a refractory support containing zirconia, alumina, magnesia, titania, silica, beryllia, thoria, lanthania, calcium oxide, and mixtures of those.

The term "maintaining CPOX promoting conditions" refers to regulating hydrocarbon feedstock composition, pressure, space velocity, gas preheating and catalyst temperature and contact time such that the direct partial oxidation reaction is favored (as shown in Equation 2, in the representative case of methane as the hydrocarbon). At the same time, preferably the reaction conditions are also manipulated, e.g., by varying the carbon:oxygen ratio of the reactant gas mixture, so as to sustain the reaction autothermally. In certain embodiments of the method, the contacting comprises contacting the reactant gas mixture with a supported nickel-based catalyst comprising nickel a Ni-stabilizing amount of gold or silver, and a refractory support, which may be in the form of monoliths, granules, spheres, particles and pellets.

According to certain preferred embodiments of the present invention, a highly productive process for partially oxidizing a reactant gas mixture comprising methane and oxygen to form synthesis gas comprising carbon monoxide and hydrogen is provided. This process comprises passing the reactant gas mixture over a Ni—Au or Ni—Ag alloy-containing catalyst, which also contains Yb, in a reactor under process conditions that include maintaining a molar ratio of methane to oxygen ratio in the range of about 1.5:1 to about 3.3:1, the gas hourly space velocity is maintained in excess of about 20,000 h$^{-1}$, preferably 100,000 h$^{-1}$ or more, the reactant gas mixture is maintained at a pressure in excess of about two atmospheres and at a preheat temperature of between about 30° C. and 750° C. Under these process conditions within the reactor, the high surface area catalyst structure causes the partial oxidation of the methane to proceed at high productivity, i.e., with at least 85% methane conversion, 85% selectivity to carbon monoxide and 85% selectivity to hydrogen. In preferred embodiments, the productivity is at least 90% methane conversion, 90% selectivity to carbon monoxide, and 90% selectivity to hydrogen, more preferably at least 95% methane conversion, 95% selectivity to carbon monoxide and 95% selectivity to hydrogen.

The terms "distinct" or "discrete" structures or units, as used herein, refer to supports in the form of divided materials such as granules, beads, pills, pellets, cylinders, trilobes, extrudates, spheres or other rounded shapes, or another manufactured configuration. Alternatively, the divided material may be in the form of irregularly shaped particles. Preferably at least a majority (i.e., >50%) of the particles or distinct structures have a maximum characteristic length (i.e., longest dimension) of less than six millimeters, preferably less than three millimeters. The term "monolith" as used herein is any singular piece of material of continuous manufacture such as solid pieces of metal or metal oxide or foam materials or honeycomb structures. In some embodiments, two or more catalyst monoliths are stacked in the catalyst zone of the reactor. In any case, the new stabilized nickel catalysts, catalyst systems or catalyst beds have sufficient porosity, or sufficiently low resistance to gas flow, to permit a stream of said reactant gas mixture to pass over the catalyst at a gas hourly space velocity (GHSV) of at least about 20,000 h$^{-1}$, preferably at least about 100,000 h$^{-1}$, which corresponds to a weight hourly space velocity (WHSV) of about 200–1,000 h$^{1}$, when the reactor is operated to produce synthesis gas. Preferably the reactor is operated at a reactant gas pressure greater than 2 atmospheres (about 200 kPa), which is advantageous for optimizing syngas production space-time yields.

In some embodiments, the reactant gas mixture is preheated to about 30° C.–750° C. before contacting the catalyst. The preheated feed gases pass through the catalytic materials to the point at which the partial oxidation reaction initiates. An overall or net catalytic partial oxidation (CPOX) reaction ensues, and the reaction conditions are maintained to promote continuation of the process, which preferably is sustained autothermally.

For the purposes of this disclosure, the term "net partial oxidation reaction" means that the partial oxidation reaction shown in Reaction 2, above, predominates. However, other reactions such as steam reforming (see Reaction 1), dry reforming (Reaction 3) and/or water-gas shift (Reaction 4) may also occur to a lesser extent.

$$CH_4 + CO_2 \rightarrow 2CO + 2H_2 \quad (3)$$

$$CO + H_2O \rightarrow CO_2 + H_2 \quad (4)$$

The relative amounts of the CO and H$_2$ in the reaction product mixture resulting from the catalytic net partial oxidation of the methane, or natural gas, and oxygen feed mixture are preferably about 2:1H$_2$:CO, similar to the stoichiometric amounts produced in the partial oxidation reaction of Reaction 2.

As used herein, the terms "autothermal" "adiabatic" and "self-sustaining" mean that after initiation of the partial oxidation reaction, no additional or external heat must be supplied to the catalyst in order for the production of synthesis gas to continue. Under autothermal or self-sustaining reaction conditions the feed is partially oxidized and the heat produced by that exothermic reaction drives the continued net partial oxidation reaction. Consequently, under autothermal process conditions there is no external heat source required. The net partial oxidation reaction conditions are promoted by optimizing the concentrations of hydrocarbon and O$_2$ in the reactant gas mixture, preferably within the range of about a 1.5:1 to about 3.3:1 ratio of carbon:O$_2$ by weight. In some embodiments, steam may also be added to produce extra hydrogen and to control the outlet temperature. The ratio of steam to carbon by weight ranges from 0 to 1. The carbon:O$_2$ ratio is the most important variable for maintaining the autothermal reaction and the desired product selectivities. Pressure, residence or contact time (inverse of the GHSV), amount of feed preheat and amount of nitrogen dilution, if used, also affect the reaction products. Maintaining net CPOX reaction promoting conditions also includes maintaining a catalyst residence time of no more than about 200 milliseconds, preferably less than 50 milliseconds, more preferably less than 20 milliseconds. In certain of the most highly preferred embodiments, the contact time for the reactant gas mixture is 10 milliseconds or less. This is accomplished by passing the reactant gas mixture over, or through the porous structure of the catalyst system at a gas hourly space velocity (GHSV) of about 20,000–100,000,000 h$^{-1}$, preferably about 50,000–50,000,000 h$^{-1}$, more preferably about 100,000–25,000,000 h$^{-1}$. The latter range corresponds to a weight hourly space velocity (WHSV) of 1,000 to 25,000 h$^{-1}$. In preferred embodiments of the process, the catalyst system catalyzes the net partial oxidation of at least 90% of a methane feedstock to CO and H$_2$ with a selectivity for CO and H$_2$ products of at least about 90% CO and 90% H$_2$.

In certain embodiments of the process, the step of maintaining net partial oxidation reaction promoting conditions includes keeping the temperature of the reactant gas mixture at about 30° C.–750° C. and keeping the temperature of the catalyst in the range of about 350–2,000° C., preferably between about 450–1,200° C., by adiabatic, self-sustaining reaction. In some embodiments, the process includes maintaining the reactant gas mixture at a pressure of about 100–32,000 kPa (about 1–32 atmospheres), preferably about 200–10,000 kPa (about 2–10 atmospheres), while contacting the catalyst.

In some embodiments, the process comprises mixing a methane-containing feedstock and an O$_2$-containing feedstock together in a carbon:O$_2$ ratio of about 1.5:1 to about 3.3:1, preferably about 1.7:1 to about 2.1:1, and more preferably about 2:1). Preferably the methane-containing feedstock is at least 80% methane, more preferably at least 90%.

According to certain embodiments of the present invention, a method of converting a light hydrocarbon and O$_2$ to a product mixture containing CO and H$_2$ is provided. The process includes forming a reactant gas mixture comprising a light hydrocarbon containing gas and an O$_2$ containing gas, and, in a reactor, passing the reactant gas mixture over a refractory supported nickel-gold or nickel-silver alloy catalyst prepared by sequentially applying a gold or silver precursor compound, such as a gold or silver salt, to a nickel precursor compound, such as a nickel salt, to the support and stabilizing the catalyst. The term "refractory support" refers to any material that is mechanically stable to the high temperatures of a catalytic partial oxidation reaction, which is typically 500° C.–1,600° C., but may be as high as 2,000° C. Suitable refractory support materials include zirconia, magnesium stabilized zirconia, zirconia stabilized alumina, yttrium stabilized zirconia, calcium stabilized zirconia, alumina, cordierite, titania, silica, magnesia, niobia, vanadia and the like. Preferably the alumina component is alpha-alumina.

In certain embodiments the Ni-stabilized catalyst comprises up to about 1 wt. % Au (by weight of the total metal content of the supported catalyst). In certain embodiments the Ni-stabilized catalyst comprises up to about 3.3 wt. % Ag and about 2 wt % Yb. In certain embodiments the supported nickel-based syngas catalyst comprises an amount of the Ni-stabilizing metal that provides a catalyst that favors the CPOX reaction over other possible hydrocarbon oxidation reactions when the catalyst is employed in a reaction zone of a millisecond contact time syngas production reactor under CPOX promoting conditions. These and other embodiments, features and advantages of the present invention will become apparent with reference to the following description.

DETAILED DESCRIPTION OF PREFERRED EMBODIMENTS

New Ni-based syngas production catalysts contain nickel promoted with a Ni-stabilizing metal, preferably Au, carried on refractory supports such as zirconia, alumina or cordierite, are prepared as described below. A preferred support material is partially stabilized zirconia (PSZ), modified with an alkaline earth metal oxide or a lanthanide metal oxide. These promoted Ni catalysts are capable of catalytically converting $C_1$–$C_5$ hydrocarbons (e.g., methane or natural gas) to synthesis gas containing CO and $H_2$. They are preferably in the form of foams, monoliths, granules, spheres, pellets, pills, beads and particles. It is now demonstrated that new Au promoted nickel catalyst structures, especially when prepared as described in the following example, are highly active syngas production catalysts with sufficient thermal stability to resist melting and metal loss at reaction temperatures when employed on-stream in a short contact time reactor for synthesis gas production. Without wishing to be restricted to a particular theory, it is concluded from the present studies that alloying Ni with Au, Ag or another suitable alloying metal, serves to elevate the melting temperature of the nickel and deter loss of nickel at on-stream CPOX syngas production temperatures. Activity of the catalyst is therefore preserved over a longer period of time than is possible with conventional nickel catalysts used for syngas production. It is also observed in the present studies that the promoter serves to lower the light-off and reaction temperatures and to reduce coking of the catalyst during operation. Including a lanthanide element, preferably Yb, further enhances catalyst performance. The new stabilized Ni catalysts are expected to serve as good substitutes for the more costly rhodium catalysts that are employed today in CPOX syngas production processes. A Ni-stabilized catalyst is more resistant to high temperature reactor operating conditions (up to at least 1,600° C.) and is longer lived, experiencing reduced coking on stream, than a typical metallic nickel-based syngas catalyst.

The following examples are offered by way of illustration, and not by way of limitation. Those skilled in the art will recognize that variations of the invention embodied in the example can be made, especially in light of the teachings of the various references cited herein, the disclosures of which are incorporated by reference.

EXAMPLE 1

11 wt % Ni—0.2 wt % Au Alloy on PSZ

A representative Au-promoted Ni catalyst containing 11% Ni and 0.2% Au (by weight of the total supported catalyst) supported on a MgO stabilized PSZ monolith was prepared by dissolving $Ni(NO_3)_2 \cdot xH_2O$ (Aldrich) in water to form an aqueous solution. The concentration of the Ni solution and the amount loaded onto the PSZ monolith were chosen so as to provide the final wt % of Ni metal stated in Table 1. A PSZ(MgO containing) monolith about 12 mm diameter and 9.5 mm (⅜ inch) thick and containing 80 pores per linear inch (ppi) (Vesuvius Hi-Tech Ceramics, NY or Porvair Advanced Materials Inc., NC) was situated on a Teflon® plate resting on a warm (75° C.) hotplate. The Ni salt solution was gradually added to the monolith, allowing the water to evaporate between saturations. The dried monolith was then calcined in air (static or flowing) according to the following program: heat from room temperature (RT) to about 125° C. at a rate of about 3° C./min, dwell at that temperature for about 60 min; heat from about 125° C. to about 400–900° C., preferably about 500° C., at a rate of about 1–10° C./min, preferably about 5° C./min, dwell at that temperature for about 120–360 min, or more, preferably about 180 min.

Next, an aqueous solution of $Au(NH_3)_4(NO_3)_3$ was added dropwise to saturate the Ni-coated PSZ monolith. The concentration of the Au solution and the amount loaded onto the PSZ monolith was chosen so as to provide the final wt % of Au stated in Table 1. The Au salt solution was gradually added to the monolith, allowing the water to evaporate between saturations. The dried monolith was then calcined in air, according to the program described above for the Ni-impregnated monolith.

This final calcined PSZ supported Ni—Au catalyst was then reduced in flowing $H_2$ (or $H_2/N_2$ mixture) at a flow rate of about 0.1–1 normal liters per minute (NLPM), or more, preferably about 0.6 NLPM, while applying heat according to the following program: heat from room temperature (RT) to about 125° C. at a rate of temperature increase of 3° C./min, dwell for about 30 min at that temperature; heat from about 125° C. to about 300 to 900° C., preferably about 500° C., at a rate of increase of about 1 to 10° C./min, preferably about 3° C./min, dwell at that temperature for about 60–360 min, or more, preferably about 180 min. The catalytic activity of the resulting Ni/Au catalyst was evaluated under partial oxidation reaction promoting conditions in a laboratory scale short contact time reactor, as described below under "Test Procedure."

A preferred catalyst support structure is a foam monolith made of partially (MgO) stabilized zirconia (PSZ), or alpha-alumina. Another refractory ceramic oxide foam monolith that is chemically and physically stable under the required partial oxidation reaction conditions could be substituted for the PSZ monolith, if desired. The term "monolith" refers to any singular piece of material of continuous manufacture such as solid pieces of metal or metal oxide or foam materials or honeycomb structures. Two or more such catalyst monoliths may be stacked in the catalyst zone of the reactor if desired. In any case, the catalyst device, system or bed has sufficient porosity, or sufficiently low resistance to gas flow, to permit a stream of said reactant gas mixture to pass over the catalyst at a gas hourly space velocity (GHSV) of at least about 20,000 h$^{-1}$, preferably at least 100,000 h$^{-1}$, when the reactor is operated to produce synthesis gas and elemental sulfur from a mixture of H$_2$S and light hydrocarbon.

For example, zirconia, alumina, cordierite, mullite, magnesia, titania, silica, beryllia, thoria, lanthania, calcium oxide, and mixtures of those materials can serve as satisfactory support materials. Also, thermally stabilizing substances other than MgO could also be used with success in the supports, such as calcium or yttrium oxide. Suitable foams for use in the preparation of the catalyst preferably have from 30 to 150 pores per inch (12 to 60 pores per centimeter). Alternative support structures for the catalyst include refractory oxide honeycomb monolith structures, such as a honeycomb substrate made of cordierite or mullite (which are available from known commercial sources), or other configuration having longitudinal channels or passageways permitting high space velocities with a minimal pressure drop. Preferred supports have a tortuosity of about 1.0. Such configurations are known in the art and described, for example, X. Xu and J. A. Moulijn, "Transformation of a Structured Carrier into Structured Catalyst" in STRUCTURED CATALYSTS AND REACTORS, A. Cybulski and J. A. Moulijn (Eds.), Marcel Dekker, Inc., 1998, (Ch. 21) p. 599–615.

Still other suitable support geometries include discrete or divided structures or units in the form of divided materials such as granules, beads, pills, pellets, cylinders, trilobes, extrudates, spheres or other rounded shapes, or another manufactured configuration. Alternatively, the divided material may be in the form of irregularly shaped particles. Preferably at least a majority (i.e., >50%) of the particles or distinct structures have a maximum characteristic length (i.e., longest dimension) of less than ten millimeters, preferably less than five millimeters. These particulate supports are impregnated with the catalyst precursor materials as described above for the PSZ monolith, or by any suitable technique, including impregnation, washcoating, adsorption, ion exchange, precipitation, co-precipitation, deposition precipitation, sol-gel method, slurry dip-coating, microwave heating, and other methods known in the art for preparing a supported catalyst. The granule or spheres preferably range in size from 50 microns to 6 mm in diameter (i.e., about 120 mesh, or even smaller, to about ¼ inch). More preferably the particles are no more than 3 mm in their longest characteristic dimension, or range from about 80 mesh (0.18 millimeters) to about ⅛ inch, and more preferably about 35–50 mesh. The term "mesh" refers to a standard sieve opening in a screen through which the material will pass, as described in the Tyler Standard Screen Scale (C. J. Geankoplis, TRANSPORT PROCESSES AND UNIT OPERATIONS, Allyn and Bacon, Inc., Boston, Mass., p. 837), hereby incorporated herein by reference. According to this scale, 20–120 wire mesh screen has 0.841–0.122 mm sieve opening with 0.510–0.89 mm nominal wire diameter. Preferably the support materials are pre-shaped as granules, spheres, pellets, or other geometry that provides satisfactory engineering performance, before application of the catalytic materials. Although it is preferred that the promoter and the nickel are applied by sequential impregnation, as exemplified above, catalysts with acceptable activity can also be prepared by applying the nickel and promoter metal salts simultaneously as a mixture.

EXAMPLE 2. (COMPARATIVE)

4 wt % Rh—5 wt % Sm on PSZ Foam

Sm(NO$_3$)$_3$.6H$_2$O (Aldrich) was dissolved in sufficient water to form an aqueous solution. A PSZ monolith about 15 mm long and 12 mm diameter was situated on a Teflon® plate resting on a warm (75° C.) hotplate. Satisfactory PSZ monoliths can be obtained commercially (Vesuvius Hi-Tech Ceramics, NY or Porvair Advanced Materials Inc., NC). The entire Sm salt solution was gradually added to the monolith, allowing the water to evaporate between saturations. The dried monolith was then calcined in air (static or flowing) according to the following program: heat from room temperature (RT) to about 125° C. at a rate of about 3° C./min, dwell at that temperature for about 60 min; heat from about 125° C. to about 400–900° C., preferably about 500° C., at a rate of about 1–10° C./min, preferably about 5° C./min, dwell at that temperature for about 120–360 min, or more, preferably about 180 min.

An aqueous solution of RhCl$_3$.xH$_2$O was added dropwise to saturate the Sm-coated PSZ monolith, prepared as described in the above paragraph. The Rh salt solution was gradually added to the monolith, allowing the water to evaporate between saturations. The dried monolith was then calcined in air, according to the program described above.

This final calcined Rh/Sm/PSZ catalyst system was then reduced in flowing H$_2$ (or H$_2$N$_2$ mixture) at a flow rate of about 0.1–1 NLPM, or more, preferably about 0.6 NLPM, while applying heat according to the following program: heat from room temperature (RT) to about 125° C. at a rate of temperature increase of 3° C./min, dwell for about 30 min at that temperature; heat from about 125° C. to about 300 to 900° C., preferably about 500° C., at a rate of increase of about 1 to 10° C./min, preferably about 3° C./min, dwell at that temperature for about 60–360 min, or more, preferably about 180 min. The concentrations of the Sm and Rh solutions and the amounts loaded onto the PSZ monolith were chosen so as to provide a final wt. % of each metal of 4 wt. % Rh and 5 wt. % Sm (wt. % of total weight of the metal content of the catalyst and support).

Test Procedure-1

Representative promoted Ni-based catalysts were evaluated for ability to catalyze the partial oxidation reaction in a conventional flow apparatus in a conventional flow apparatus using a quartz reactor with a length of 12 inches, an outside diameter of 19 mm and an inside diameter of 13 mm. Ceramic foam pieces of 99% Al$_2$O$_3$ (12 mm outside diameter×5 mm thick, with 45 pores per linear inch) were placed before and after the catalyst as radiation shields. The inlet radiation shield also aided in uniform distribution of the feed gases. An Inconel-sheathed, single point K-type (Chromel/Alumel) thermocouple was placed axially inside the reactor, touching the top (inlet) face of the radiation shield. A high temperature S-Type (Pt/Pt 10% Rh) bare-wire thermocouple was positioned axially touching the bottom face of the catalyst, and was used to indicate the reaction temperature. The catalyst and the two radiation shields were tightly sealed against the inside walls of the quartz reactor by wrapping the shields radially with a high purity (99.5%) alumina paper. A 600-watt band heater set at 90% electrical output was placed around the quartz tube, providing heat to light off the reaction and preheat the feed gases. The bottom of the band heater corresponded to the top of the upper radiation shield.

In addition to the thermocouples placed above and below the catalyst, the reactor also contained two axially positioned, triple-point thermocouples, one before and another after the catalyst. These triple-point thermocouples were used to determine the temperature profiles of the reactants and products that were subjected to preheating and quenching, respectively.

The runs were conducted at a CH$_4$:O$_2$ molar ratio of 2:1 with a combined flow rate of 7.7 SLPM (standard liters per minute), corresponding to a gas hourly space velocity of 350,000–400,000 h$^{-1}$ and at a pressure of 5 psig (136 kPa). The reactor effluent was analyzed using a gas chromatograph equipped with a thermal conductivity detector.

TABLE 1

Catalyst Performance

| Example | Catalyst | CH$_4$ Conv. | CO Sel. | H$_2$ Sel. |
|---|---|---|---|---|
| 1 | 11% Ni-0.2% Au/PSZ monolith | 77.8 | 93 | 94.3 |
| (Comparative) 2 | 4% Rh/5% Sm/PSZ monolith | 81.4 | 94.2 | 91.5 |

There are two major problems associated with the use of conventional Ni-containing catalysts for catalyzing the partial oxidation of methane: coking and nickel evaporation. In the present series of studies, it was observed that a Au-promoted nickel catalyst avoided the coking problem. As shown in Table 1, the catalytic performance of the Au-promoted Ni catalyst, supported on a PSZ monolith is close to that of a PSZ supported 4% Rh/5% Sm catalyst, prepared and evaluated under similar test conditions. In these studies it was also observed that the Ni—Au surface alloy also appears to deter evaporation of Ni over the course of a 3–4 hour period of time on stream in a CPOX reactor producing synthesis gas.

EXAMPLE 3

Ag—Yb-Promoted Ni—MgO Solid Solution Catalyst

A silver and ytterbium-promoted Ni—MgO solid solution catalyst supported on 80-ppi PSZ foam was prepared according to the following procedure, given here for laboratory-scale batches.

(a) A solution containing 0.4779 gram of Mg(NO$_3$)$_2$.6H$_2$O (Aldrich 23,717-5) in 1.7355 grams of distilled and de-ionized (DDI) water was prepared at about 60° C. on a hotplate. Part of this solution was added drop wise to PSZ foam (partially stabilized zirconia with Mg, 80-ppi, ⅜" L×½" D, 0.7496 gram).

(b) The wet PSZ foam is dried at about 60° C. for 2 hours on the hotplate and calcined in air according to the following schedule: 5° C./min ramp up to 125° C.; hold at 125° C. for 1 hour; 5° C./min ramp up to 500° C.; hold at 500° C. for 3 hours; 10° C./min ramp down to room temperature. After this calcination step, the loaded support contained 4.68 wt % MgO based on the weight of PSZ support.

(c) Next, a solution containing 1.5665 grams of Ni(NO$_3$)$_2$.6H$_2$O (Aldrich 24,407-4) in 4.5905 grams of DDI water was prepared at about 60° C. on the hotplate. Part of this solution was added drop wise to the MgO-coated PSZ foam. The wet support was then dried at about 60° C. for 1 hour on the hotplate, and calcined in air according to the following schedule: 5° C./min ramp up to 125° C.; hold at 125° C. for 1 hour; 5° C./min ramp up to 500° C.; hold at 250° C. for 1 hour; ramp up to 900° C.; hold at 900° C. for 3 hours; 10° C./min ramp down to room temperature. After this calcination step, the support contained 7.58 wt % NiO based on the weight of PSZ support.

(d) Addition of the nickel nitrate solution, drying and calcination were repeated, using the same procedure as described in (c), above. After the second Ni impregnation, the calcined catalyst intermediate (i.e., NiO+MgO-coated support) contained 18.9 wt % NiO based on the weight of PSZ support. This weight of NiO corresponds to 14.9 wt % of Ni based on the weight of PSZ support.

(e) Next, 0.0399 gram of Yb(NO$_3$)$_3$.5H$_2$O and 0.0555 gram of Ag(NO$_3$).xH$_2$O (Aldrich 20,913-8) were dissolved in 0.6746 gram of DDI water at about 60° C. on the hotplate and added drop wise to the (NiO+MgO)-coated PSZ foam. The wet foam was then dried at about 60° C. for 1 hour on the hotplate, and calcined in air according to the following schedule: 1° C./min ramp up to 140° C.; hold at 140° C. for 2 hours; 5° C./min ramp down to room temperature. After calcination, the loaded support contained 2.05 wt % Yb and 3.3 wt % Ag based on the weight of PSZ support.

(f) Finally, the loaded support was reduced with H$_2$ using 1:1 by volume flow of N$_2$:H$_2$ mixture at 0.2 standard liter per minute (SLPM) measured at 0° C. and 1 atm pressure, using the following schedule: 3° C./min ramp up to 125° C.; hold at 125° C. for 0.5 hour; 3° C./min ramp up to 800° C.; hold at 800° C. for 3 hours; 5° C./min ramp down to room temperature. The composition of the final catalyst was 3.3 wt % Ag, 2.05 wt % Yb, 14.9 wt % Ni and 4.68 wt % MgO.

Test Procedure-2

The catalytic performance of the Ag—Yb-promoted Ni—MgO solid solution catalyst of Example 2 was evaluated in a pilot plant reactor at 45 psig. The partial oxidation reactions were carried out in a conventional flow apparatus using a 19 mm O.D.×13 mm I.D. quartz insert embedded inside a refractory-lined steel vessel. The quartz insert contained a catalyst system containing at least one porous monolith catalyst (about 12 mm O.D.×15 mm high) held between two foam disks. In the case of the pill-supported catalyst (Example 10), the catalyst was packed between the two foam disks. The upper disk typically consisted of 65-ppi PSZ and the bottom disk typically consisted of 30-ppi zirconia-toughened alumina. Preheating the methane or natural gas that flowed through the catalyst system provided the heat needed to start the reaction. Oxygen was mixed with the methane or natural gas immediately before the mixture entered the catalyst system. Once the reaction started, it proceeded autothermally. Two Type K thermocouples with ceramic sheaths were used to measure catalyst inlet and outlet temperatures. The molar ratio of CH$_4$ to O$_2$ was generally about 2:1, however the relative amounts of the gases, the catalyst inlet temperature and the reactant gas pressure could be varied by the operator according to the parameters being evaluated (see Table 2). The product gas mixture was analyzed for CH$_4$, O$_2$, CO, H$_2$, CO$_2$ and N$_2$ using a gas chromatograph equipped with a thermal conductivity detector. A gas chromatograph equipped with flame ionization detector analyzed the gas mixture for CH$_4$, C$_2$H$_6$, C$_2$H$_4$ and C$_2$H$_2$. The CH$_4$ conversion levels and the CO and H$_2$ product selectivities obtained for a catalyst evaluated in this test system are considered predictive of the conversion and selectivities that will be obtained when the same catalyst is employed in a commercial scale short contact time reactor under similar conditions of reactant concentrations, temperature, reactant gas pressure and space velocity.

TABLE 2

Catalyst Performance of Ag-Yb-promoted Ni-MgO Solid Solution Catalyst

| Preheat T (deg. C.) | Operating Pressure (psig) | $O_2$/Fuel molar ratio | GHSV ($h^{-1}$) | Reaction T (deg. C.) | $CH_4O_2$ conv. (%) | $CO/H_2$ sel. (%) | $H_2$:CO ratio |
|---|---|---|---|---|---|---|---|
| 425 | 45 | 0.5461 | 1,632,000 | 1145 | 83.4/98.9 | 92.5/84.2 | 1.77 |
| 425 | 45 | 0.5386 | 1,632,000 | 1142 | 75.8/99.5 | 84.5/71.9 | 1.64 |
| 425 | 45 | 0.5042 | 1,570,000 | 1151 | 70.6/99.5 | 79.8/67.8 | 1.58 |

As shown in Table 2, the performance varied as a function of the Oxygen/Fuel ($CH_4$) ratio. As the ratio increased, conversion and selectivity increased, which indicated that the catalyst is selective to syngas generation. A non-selective catalyst would show an increase in $CO_2$ and $H_2O$ selectivity and a corresponding decrease in CO and $H_2$ selectivity, but the fact that the syngas selectivity increased with increasing oxygen content in the feed confirms the syngas-selective nature of this catalyst composition. It should be noted that this performance was achieved at a contact time of 2.2 milliseconds (corresponding to a GHSV of 1,632,000 $h^{-1}$), which demonstrates the activity of the catalyst for short contact time CPOX reaction. By controlling the Oxygen/Fuel ratio and flowrates, it is expected that further improvement in syngas performance will be achieved with this preferred catalyst formulation.

Process of Producing Synthesis Gas

For the production of syngas, any suitable reaction regime may be applied in order to contact the reactants with a stabilized Ni catalyst described above. One suitable regime is a fixed bed reaction regime, in which the catalyst is retained within a reaction zone in a fixed arrangement, retained using fixed bed reaction techniques that are well known and have been described in the literature. A hydrocarbon and $O_2$-containing reactant gas mixture is contacted with a stabilized nickel-based catalyst in a reaction zone maintained at partial oxidation-promoting conditions of temperature, pressure and flow rate, as indicated below, effective to produce an effluent stream comprising carbon monoxide and hydrogen. Preferably a short or millisecond contact time reactor is employed. Several schemes for carrying out catalytic partial oxidation (CPOX) of hydrocarbons in a short contact time reactor are well known and have been described in the literature. Preferably methane and an $O_2$-containing feedstock are combined to provide the reactant gas mixture. Natural gas, or other light hydrocarbons having from 2 to 5 carbon atoms, and mixtures thereof, also serve as satisfactory feedstocks. The $O_2$ containing feedstock is preferably pure oxygen gas, but it may also be air or $O_2$-enriched air. In addition, the oxygen-containing gas may also comprise steam and/or $CO_2$ in addition to oxygen. The reactant gas mixture is fed into a reactor where it comes into contact with a catalytically effective amount of a stabilized nickel catalyst carried on a refractory support. The reactant gas mixture passes over the catalyst at a gas hourly space velocity of at least about 20,000 $h^{-1}$, which corresponds to a weight hourly space velocity (WHSV) of about 200 $h^{-1}$, when the reactor is operated to produce synthesis gas. The hydrocarbon feedstock and/or the oxygen-containing gas may be pre-heated before contacting the catalyst, preferably the reactant gas mixture is pre-heated to a temperature of about 30–750° C., more preferably not more than about 525° C. Catalytically inert porous ceramic foam monoliths are preferably placed before and after the catalyst as radiation shields. The inlet radiation shield also typically aids in uniform distribution of the feed gases into the catalyst zone.

The reactant gas mixture passes over the catalyst and the catalytic materials are heated to the point at which they ignite and start the reaction. An autothermal net catalytic partial oxidation reaction preferably ensues, and the reaction conditions are managed so as to promote continuation of the autothermal process. For the purposes of this disclosure, "autothermal" means that after catalyst ignition, no additional heat must be supplied to the catalyst in order for the production of synthesis gas to continue. Autothermal reaction conditions are promoted by optimizing the concentrations of hydrocarbon and $O_2$ in the reactant gas mixture, preferably within the range of about a 1.5:1 to about 2.3:1 ratio of carbon:oxygen. The hydrocarbon:oxygen ratio is an important variable for maintaining the autothermal CPOX reaction and the desired product selectivities, although maintaining the desired temperature, for example, may in some instances require variation of the carbon:oxygen ratio. Pressure, residence time, amount of feed preheat and amount of nitrogen dilution, if used, also affect the reaction products. The process preferably includes maintaining a catalyst residence time of no more than about 200 milliseconds, more preferably under 50 milliseconds, and still more preferably under 20 milliseconds, with 10 milliseconds or less being highly preferred for the reactant gas mixture. This is accomplished by passing the reactant gas mixture over the catalyst at a gas hourly space velocity (GHSV) of about 20,000–10,000,000 $h^{-1}$, preferably about 50,000–6,000,000 $h^{-1}$. This range of preferred gas hourly space velocities corresponds to a weight hourly space velocity (WHSV) of about 500 to 60,000 $h^{-1}$. Under near optimal reaction conditions, a preferred catalyst catalyzes the net partial oxidation of at least 90% of a methane feedstock to CO and $H_2$ with a selectivity for CO and $H_2$ products of at least about 90% CO and 90% $H_2$. Maintaining CPOX reaction promoting conditions may include keeping the temperature of the catalyst in the preferred range of about 450–1,200° C., and maintaining a reactant gas pressure of about 100–32,000 kPa, preferably about 200–10,000 kPa, while contacting the catalyst. Near ideal operating conditions also include mixing a methane-containing feedstock and an $O_2$-containing feedstock together in a carbon:oxygen ratio of about 1.5:1 to about 2.2:1, and preferably about 2:1. Preferably the methane-containing feedstock is at least about 50% methane by volume, more preferably at least 80% methane. Natural gas is mostly methane, but it can also contain up to about 25 mole % ethane, propane, butane and higher hydrocarbons. The new syngas generation process is suitable for the conversion of gas from naturally occurring reserves of methane, which can also contain carbon dioxide, nitrogen, hydrogen sulfide, and other minor components. The product gas mixture emerging from the reactor preferably has the desired Fischer-Tropsch syngas feed $H_2$:CO ratio of 2:1.

While the preferred embodiments of the invention have been shown and described, modifications thereof can be made by one skilled in the art without departing from the spirit and teachings of the invention. The embodiments described herein are exemplary only, and are not intended to be limiting. For example, pure methane was employed in the representative test procedures, however, any light hydrocarbon (i.e., $C_1$–$C_5$) gaseous feedstock could also serve as a satisfactory feedstock for the catalytic partial oxidation reaction catalyzed by the new Ni-based catalysts. Many variations and modifications of the invention disclosed herein are possible and are within the scope of the invention. The discussion of certain references in the Description of Related Art, above, is not an admission that they are prior art to the present invention, especially any references that may have a publication date after the priority date of this application. The disclosures of all patents, patent applications, and publications cited herein are hereby incorporated by reference.

What is claimed is:

1. A method of converting a $C_1$–$C_5$ hydrocarbon to a product gas mixture comprising CO and $H_2$, the method comprising:

contacting a reactant gas mixture comprising said hydrocarbon and a source of $O_2$ with a Ni-based catalyst comprising a catalytically effective amount of nickel and a nickel-stabilizing amount of gold, and optionally, a lanthanide element, disposed on a refractory support in the reaction zone of a syngas production reactor such that a portion of reactant gas mixture flowing over said catalyst is in contact with said catalyst for no more than about 200 milliseconds; and maintaining autothermal net catalytic partial oxidation promoting conditions during said contacting.

2. The method of claim 1 wherein said refractory support has a structure chosen from the group consisting of monoliths, granules, beads, pills, pellets, cylinders, trilobes, extrudates and spheres.

3. The method of claim 1 wherein said refractory support comprises a material chosen from the group consisting of zirconia, alumina, cordierite, mullite, magnesia, titania, silica, beryllia, thoria, lanthania, calcium oxide, and combinations thereof.

4. The method of claim 3 wherein said refractory support comprises partially stabilized zirconia.

5. The method of claim 1 wherein said nickel and gold are in their reduced metal states.

6. The method of claim 1 wherein said catalyst comprises an alloy of Ni and Au.

7. The method of claim 6 wherein said catalyst comprises up to 3.3 wt % Au.

8. The method of claim 6 wherein said catalyst comprises a Ni—MgO solid solution, a Ni—Au alloy, a lanthanide element and a refractory support.

9. The method of claim 1 wherein said alloy has a melting temperature above the maximum operating temperature of said reactor when operated under catalytic partial oxidation conditions.

10. The method of claim 1 wherein said catalyst comprises a lanthanide element chosen from the group consisting of Sm and Yb.

11. The method of claim 1 wherein said contacting comprises contacting a reactant gas mixture comprising said hydrocarbon and a source of oxygen with said catalyst at a contact time of less than 50 milliseconds.

12. The method of claim 11 comprising a contact time of less than 10 milliseconds.

13. The method of claim 1 wherein said step of maintaining said catalyst at CPOX conditions during said contacting includes maintaining a temperature in the range of about 350° C.–2,000° C.

14. The method of claim 13 wherein said step of maintaining CPOX promoting conditions comprises maintaining a temperature in the range of 450° C.–1,200° C.

15. The method of claim 1 wherein said step of maintaining CPOX promoting conditions during said contacting includes maintaining gas pressure in the range of about 100–32,500 kPa.

16. The method of claim 15 wherein said step of maintaining CPOX promoting conditions during said contacting includes maintaining gas pressure in the range of about 200–10,000 kPa.

17. The method of claim 16 wherein the conversion of said hydrocarbon is greater than 70%.

18. The method of claim 17 wherein the conversion of said hydrocarbon is at least 80%.

19. The method of claim 18 wherein the conversion of said hydrocarbon is at least 90%.

20. The method of claim 16 wherein the selectivity for CO product is greater than 70% and the selectivity for $H_2$ product is greater than 70%.

21. The method of claim 20 wherein the selectivity for CO product is at least 80% and the selectivity for $H_2$ product is at least 80%.

22. The method of claim 21 the selectivity for CO product is at least 90% and the selectivity for $H_2$ product is at least 90%.

23. The method of claim 1 further comprising mixing a methane-containing feedstock and an $O_2$-containing feedstock to provide a reactant gas mixture feedstock having a carbon:oxygen molar ratio in the range of about 1.5:1 to about 3.3:1.

24. The method of claim 23 wherein said mixing provides a reactant gas mixture feed having a carbon:oxygen ratio in the range of about 1.7:1 to about 2.1:1.

25. The method of claim 24 wherein said mixing provides a reactant gas mixture feed having a carbon:oxygen ratio in the range of about 2:1.

26. The method of claim 1 wherein said oxygen-containing gas further comprises steam, $CO_2$, or a combination thereof.

27. The method of claim 1 further comprising combining steam and/or $CO_2$ with said hydrocarbon feedstock.

28. The method of claim 1 wherein said $C_1$–$C_5$ hydrocarbon comprises at least about 80% methane by volume.

29. The method of claim 1 comprising preheating said reactant gas mixture.

30. The method of claim 29 comprising preheating said reactant gas mixture to a temperature in the range of 30° C. to 750° C.

31. The method of claim 1 comprising passing said reactant gas mixture over said catalyst at a gas hourly space velocity in the range of about 20,000–100,000,000 $h^{-1}$.

32. The method of claim 31 comprising passing said reactant gas mixture over said catalyst at a gas hourly space velocity in the range of about 50,000 to about 50,000,000 $h^{-1}$.

33. The method of claim 1 comprising maintaining autothermal net CPOX reaction promoting conditions during said contacting.

34. A method of converting a $C_1$–$C_5$ hydrocarbon feedstock comprising at least about 50 vol % methane to a product gas mixture comprising CO and $H_2$, the method comprising:

mixing a gaseous $C_1$–$C_5$ hydrocarbon-containing feedstock and an $O_2$-containing feedstock to provide a reactant gas mixture having a carbon:$O_2$ ratio of about 1.5:1 to about 3.3:1;

passing said reactant gas mixture over a catalytically effective amount of a stabilized nickel-based catalyst in the reaction zone of a reactor at such flow rate that the contact time for a portion of reactant gas mixture that contacts said catalyst is no more than about 20 milliseconds, said stabilized Ni-based catalyst comprising a Ni-stabilizing amount of Au or Ag and, optionally, a lanthanide element, disposed on a refractory support, said nickel-stabilizing amount of Au or Ag being sufficient to increase the melting point of said nickel under said catalytic partial oxidation promoting conditions such that volatilization and loss of nickel from said catalyst is deterred during said conversion of $C_1$–$C_5$ hydrocarbon;

during said contacting, maintaining said catalyst at a temperature in the range of 450–1,200° C.;

during said contacting, maintaining said reactant gas mixture at a pressure in excess of 200 kPa; and during said contacting, adjusting said hydrocarbon and said oxygen concentration in said reactant gas mixture feedstock to a carbon:oxygen ratio in the range of 1.7:1 to 2.1:1, such that the CPOX reaction is favored.

35. A method of converting a $C_1$–$C_5$ hydrocarbon to a product gas mixture comprising CO and $H_2$, the method comprising:

contacting a reactant gas mixture comprising said hydrocarbon and a source of $O_2$ with a Ni-based catalyst comprising a catalytically effective amount of nickel and a nickel-stabilizing amount of silver, and, optionally, a lanthanide, disposed on a refractory support, said nickel-stabilizing amount of silver being sufficient to increase the melting point at said nickel under said catalytic partial oxidation promoting conditions in the reaction zone of a syngas production reactor such that a portion of said reactant gas mixture flowing over said catalyst is in contact with said catalyst for no more than about 200 milliseconds; and maintaining autothermal net catalytic partial oxidation promoting conditions during said contacting.

36. The method of claim 35 wherein said catalyst comprises a lanthanide element chosen from the group consisting of Sm and Yb.

37. The method of claim 35 said catalyst comprises Ni—Ag alloy.

38. The method of claim 37 wherein said catalyst comprises up to 3.33 wt % Ag.

39. The method of claim 38 wherein said catalyst comprises up to 1 wt % Ag.

40. The method of claim 37 wherein said catalyst comprises a Ni—MgO solid solution, a Ni—Ag alloy, a lanthanide element and a refractory support.

41. The method of claim 7 wherein said catalyst comprises up to 1 wt % Au.

* * * * *